United States Patent [19]
Chang

[11] Patent Number: 5,759,463
[45] Date of Patent: Jun. 2, 1998

[54] METHOD FOR MANUFACTURING A SANDWICHED SHEET

[76] Inventor: Kou-I Chang, No. 15-1, lun Tsu Road, Lun Tsu Tsun, Pi To Hsiang, Chang Hua Hsien, Taiwan

[21] Appl. No.: 814,512

[22] Filed: Mar. 10, 1997

[51] Int. Cl.⁶ .................................. B29C 43/18
[52] U.S. Cl. ................. 264/112; 264/113; 264/115
[58] Field of Search ......................... 264/112, 113, 264/115

[56] References Cited

U.S. PATENT DOCUMENTS

| | | | |
|---|---|---|---|
| 4,503,115 | 3/1985 | Hemels et al. | 264/112 |
| 4,915,766 | 4/1990 | Baxter | 264/112 |
| 5,094,791 | 3/1992 | Nopper | 264/112 |
| 5,134,026 | 7/1992 | Melcher | 264/113 |

*Primary Examiner*—Mary Lynn Theisen
*Attorney, Agent, or Firm*—Charles E. Baxley, Esq.

[57] ABSTRACT

A method for manufacturing a sandwiched sheet includes grinding the natural plants into short segments and adding and mixing adhesive material into the short natural plants for forming a base material which is then heated and extruded for forming two or more boards. A woven layer of long fiber plants is engaged between the boards and includes a number of openings for allowing the base material of the boards to be filled into the openings of the woven layer and for forming a reinforced sandwiched sheet. Two layers of non-woven fabric material are engaged on the boards for forming smooth outer surfaces.

4 Claims, 3 Drawing Sheets

METHOD FOR MANUFACTURING A SANDWICHED SHEET

BACKGROUND OF THE INVENTION

1. Field of the Invention

The present invention relates to a method, and more particularly to a method for manufacturing a sandwiched sheet.

2. Description of the Prior Art

Polystyrene and plastic materials have been widely used for making packaging and padding materials. However, polystyrene and plastic materials badly pollute our environment such that production of the materials has been banned in some countries. Recently wood and paper materials have been widely used for making such padding and packaging materials. However, wood forest has been quickly reduced on the earth. Some materials are required to be invented for replacing the plastic and polystyrene materials.

In order to solve the problem, U.S. Pat. No. 5,374,670 to Ayorinde et al. has been provided for making binder from naturally occurring products. However, the binder is weak and can be used as paper material only. The binder may not be used for construction purposes.

The present invention has arisen to mitigate and/or obviate the afore-described disadvantages of the conventional sandwiched sheets.

SUMMARY OF THE INVENTION

The primary objective of the present invention is to provide a method for manufacturing a sandwiched sheet which includes a reinforcing woven layer for reinforcing the sandwiched sheet and for allowing the sandwiched sheet to be used as construction materials.

In accordance with one aspect of the invention, there is provided a method for manufacturing a sandwiched sheet, the method comprises providing a plurality of natural plants, grinding the natural plants into short segments, providing and adding adhesive material into the short natural plants and mixing the adhesive material and the short natural plants for forming a base material, heating and extruding the base material for forming at least two boards, providing a woven layer and engaging the woven layer between the boards, the woven layer including a plurality of openings, pressing the boards and the woven layer for allowing the base material of the boards to be filled into the openings of the woven layer and for forming a reinforced sandwiched sheet.

The adhesive material includes urea formaldehyde and melamine formaldehyde and further includes salt and/or resin.

Two layers of non-woven fabric material are engaged on the boards for forming smooth outer surfaces.

The woven layer includes long fiber plants selected from the group consisting of bamboo, cane and rattan.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

A method in accordance with the present invention is provided for manufacturing a sandwiched sheet for replacing the products of plastic and polystyrene materials so as to decrease polluting our environment. The sandwiched sheet may be used as padding or packaging material for engaging around an object to be packaged. In addition, the sandwiched sheet includes a reinforcing element for allowing the sandwiched sheet to be used as construction element. The sandwiched sheet may also be formed as a pan for supporting cups and/or fast food.

Figure 1:
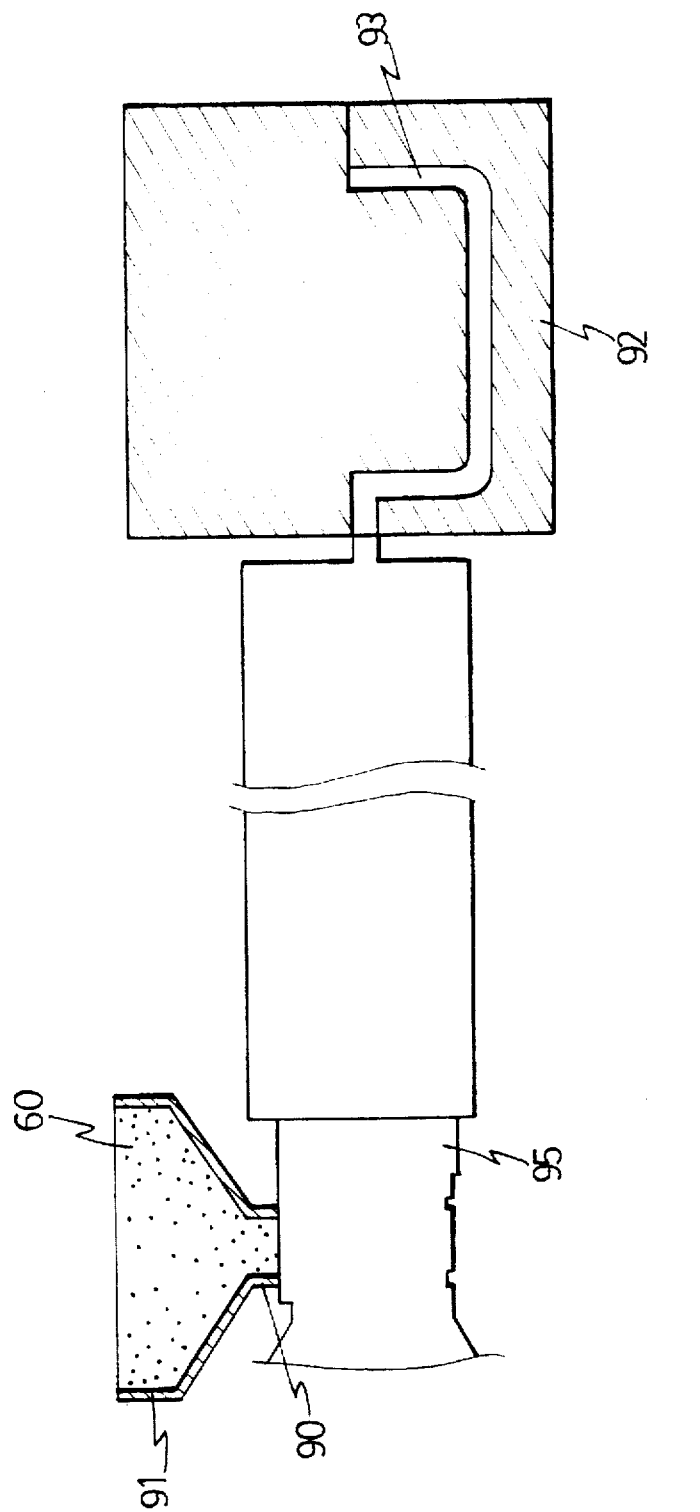
FIG. 1 is a partial cross sectional view of an extruder device and a mold device for performing the method in accordance with the present invention.
Figure 2:
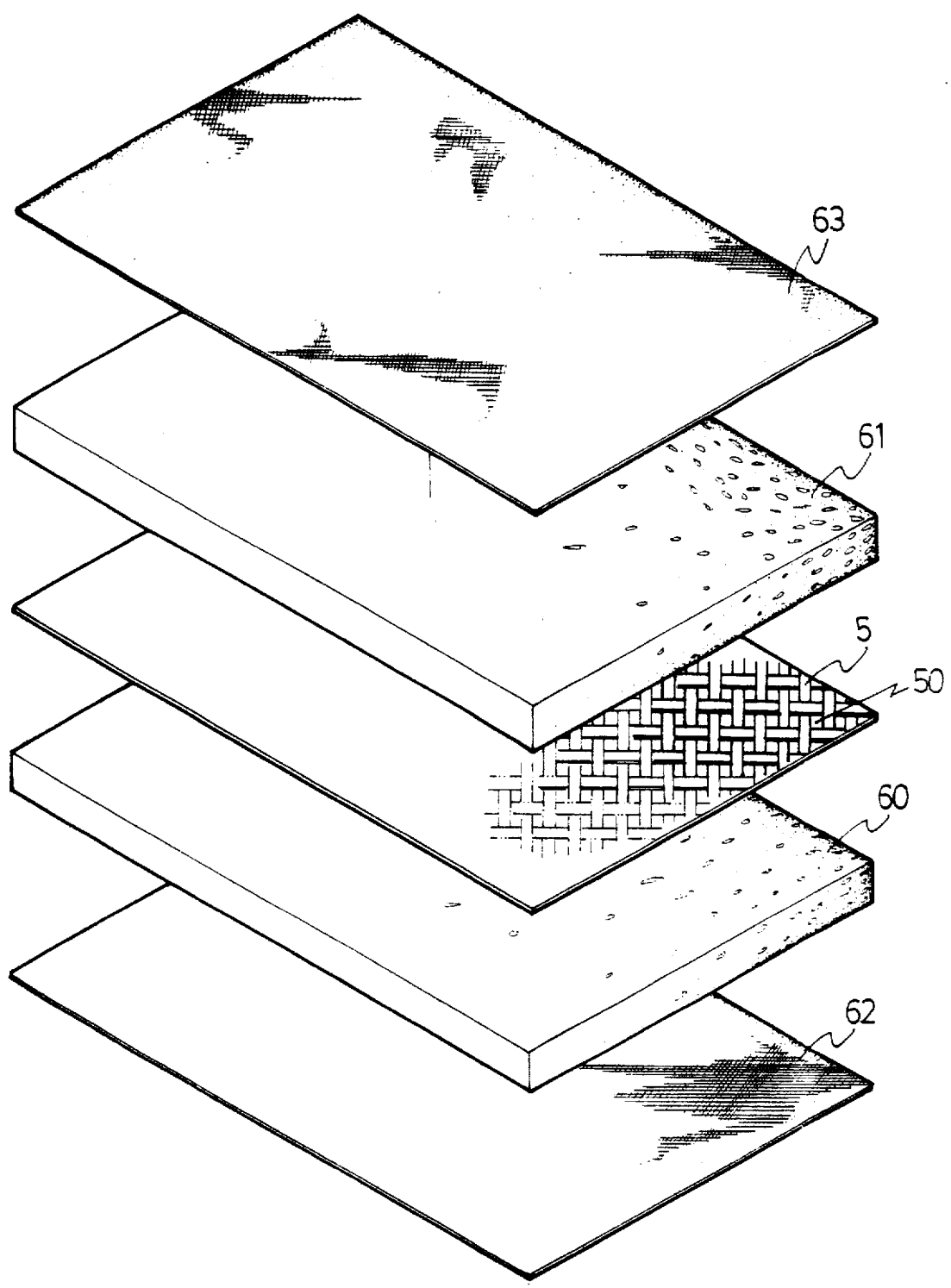
FIG. 2 is an exploded view of a sandwiched sheet to be manufactured by the method in accordance with the present invention.

The method uses fiber material of natural plants and selected from the group consisting of sugarcane, cornstalk, rice straw, rice chaff, rice husk, flax, and waste paperpulp. The fiber material is cut or chopped or ground into short segments. Adhesive material, such as urea formaldehyde and melamine formaldehyde are mixed together in a ratio of 6:4 and are then added into the fiber material in a ratio of 1:10. Resin is then added into the mixed material in a ratio of 1:9. Salt (NaCl) is then added into the mixed material in a ratio of 2:98, so as to form a base material 60 which is received in a container 91. The container 91 includes an outlet 90 for supplying the base material 60 into a heat and extruder device 95 which may heat the base material 60 to about 80° to 120° C. and which may extrude the base material 60 into a mold cavity 93 of a mold device 92 for forming a number of boards 61 (FIG. 2). The water and the ammonia gas will be vaporized so as to allow the materials to be completely blended and mixed.

Figure 3:
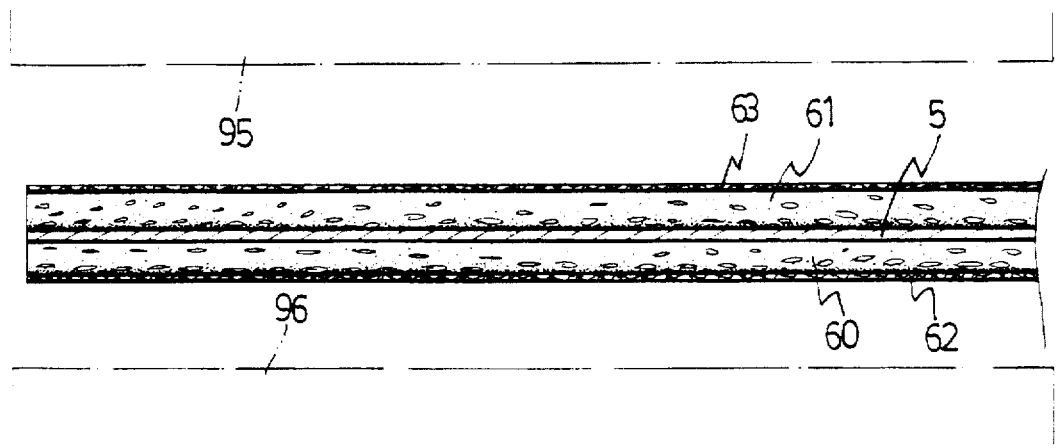
FIG. 3 is a side view of the sandwiched sheet.
Figure 4:
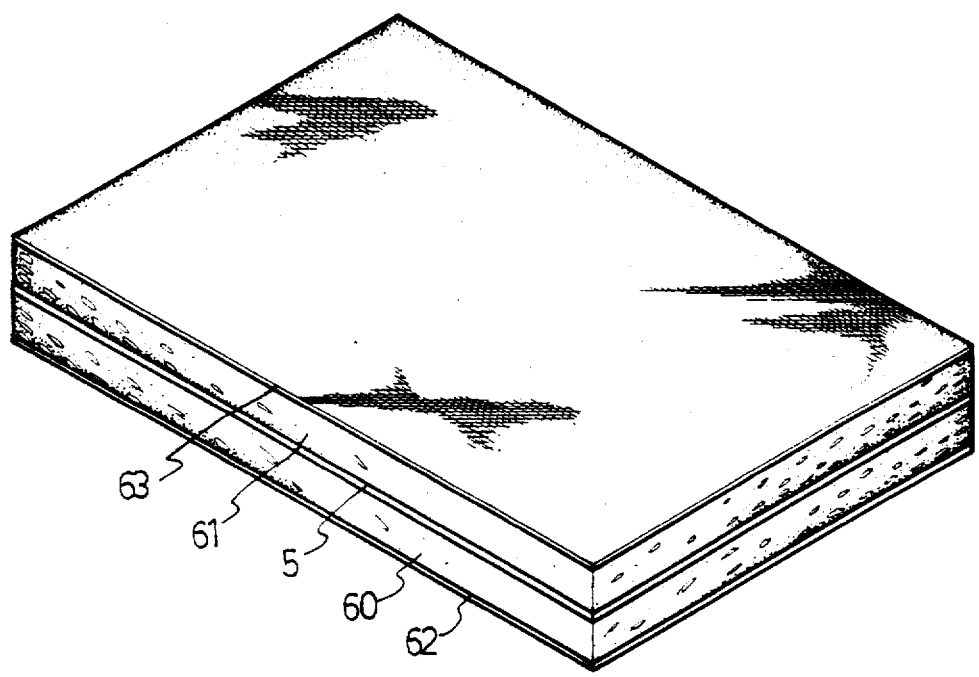
FIG. 4 is a perspective view of the sandwiched sheet.

As shown in FIG. 2, a woven layer 5 is disposed between the boards 61 of base material 60 and includes a number of openings 50 for allowing the base material 60 of the boards 61 to be forced into the openings 50 and for allowing the woven layer 5 to be solidly secured within the boards 61 and so as to form a sandwiched sheet (FIGS. 3 and 4) when the boards 61 and the woven layer 5 are forced toward each other by an upper and a lower molds 95, 96. The sandwiched sheet may thus be reinforced by the woven layer 5. Two layers of non-woven fabric material 62, 63 are engaged on the bottom and on the top of the sandwiched sheet for maintaining the shape of the sandwiched sheet and for forming smooth outer surfaces. The woven layer 5 is preferably woven and made by bamboo or cane or rattan material which is also natural plant and which includes long fibers for reinforcing purposes and for increasing the strength of the sandwiched sheet.

It is to he noted that sugarcane, cornstalk, rice straw, rice chaff, rice husk, flax all include high ignition point such that the sandwiched sheet made by such materials may be formed as an excellent fire proof material.

Accordingly, the method in accordance with the present invention may manufacture a sandwiched sheet which includes a reinforcing woven layer for reinforcing the sandwiched sheet and for allowing the sandwiched sheet to be used as an excellent fire proof construction materials.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A method for manufacturing a sandwiched sheet, said method comprising:

providing a plurality of natural plants, grinding said natural plants into short segments, providing and adding adhesive material into said short natural plants and mixing said adhesive material and said short natural plants for forming a base material, heating and extruding said base material for forming at least two boards, providing a woven layer and engaging said woven layer between said boards, said woven layer including a plurality of openings, pressing said boards and said woven layer for allowing said base material of said boards to be filled into said openings of said woven layer and for forming a reinforced sandwiched sheet.

2. A method according to claim 1, wherein said adhesive material includes urea formaldehyde and melamine formaldehyde and salt and resin.

3. A method according to claim 1, wherein said woven layer includes long fiber plants selected from the group consisting of bamboo, cane and rattan.

4. A method according to claim 1 further comprising two layers of non-woven fabric material engaged on said boards for forming smooth outer surfaces.

* * * * *